United States Patent [19]

Ren et al.

[11] Patent Number: 5,162,146
[45] Date of Patent: Nov. 10, 1992

[54] MAGNETIC RECORDING MEDIUM HAVING A PLURALITY OF MAGNETIC LAYERS AND A SPECIFIED RELATIONSHIP OF BENDING STIFFNESS

[75] Inventors: Rieko Ren; Akira Kawakami, both of Hino, Japan

[73] Assignee: Konica Corporation, Tokyo, Japan

[21] Appl. No.: 719,790

[22] Filed: Jun. 24, 1991

[30] Foreign Application Priority Data

Jun. 28, 1990 [JP] Japan ................... 2-172271

[51] Int. Cl.⁵ .............................. G11B 5/00
[52] U.S. Cl. ................... 428/212; 428/425.9; 428/694; 427/128
[58] Field of Search ............ 428/212, 402, 423.1, 428/425.9, 694, 900; 427/128

[56] References Cited

U.S. PATENT DOCUMENTS

| 4,693,934 | 9/1987 | Nishimatsu et al. | 428/336 |
| 4,780,366 | 10/1988 | Nishimatsu et al. | 428/323 |
| 4,857,388 | 8/1989 | Ogawa et al. | 428/212 |
| 5,055,351 | 10/1991 | Fujimoto et al. | 428/336 |
| 5,066,534 | 11/1991 | Goto et al. | 428/212 |

Primary Examiner—Paul J. Thibodeau
Assistant Examiner—Stevan A. Resan
Attorney, Agent, or Firm—Jordan B. Bierman

[57] ABSTRACT

A magnetic recording medium is disclosed which is improved in the durability thereof. The recording medium has a support and plurality of magnetic layers formed thereon, which layers contain a ferromagnetic powder and binder. A bending stiffness of the medium is 150 to 450 mg and a difference in the bending stiffness between the medium and the medium without its uppermost magnetic layer is not more than 20 mg per 1 μm of thickness of the uppermost layer.

19 Claims, 2 Drawing Sheets

MAGNETIC RECORDING MEDIUM HAVING A PLURALITY OF MAGNETIC LAYERS AND A SPECIFIED RELATIONSHIP OF BENDING STIFFNESS

FIELD OF THE INVENTION

The present invention relates to a magnetic recording medium, more specifically to a magnetic recording medium with improved durability wherein turbidity and noise are efficiently suppressed.

BACKGROUND OF THE INVENTION

With respect to a magnetic recording medium wherein two or more magnetic layers are formed on a non-magnetic support, when the bending stiffness increases, the magnetic recording medium becomes more liable to turbidity and noise due to degradation of head contact and the adhesion of material on the head, although, the durability improves.

It is also known that the durability of a magnetic recording medium decreases when the bending stiffness is decreased.

The present invention aims at overcoming this antinomy.

SUMMARY OF THE INVENTION

It is an object of the present invention to provide a magnetic recording medium with improved durability wherein turbidity and noise are efficiently suppressed.

To accomplish the object described above, the present invention comprises a magnetic recording medium wherein a plurality of magnetic layers are formed on a non-magnetic support, characterized in that the overall bending stiffness is 150 to 450 mg and the difference in the bending stiffness between the medium and the medium without its uppermost magnetic layer is not more than 20 mg per μm thickness of the uppermost layer.

DETAILED DESCRIPTION OF THE INVENTION

Layer configuration

Figure 1A:
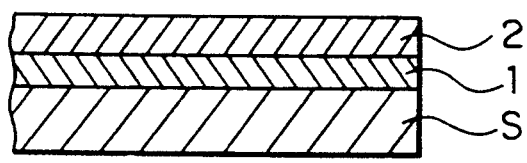
FIG. 1 is a schematic cross-sectional view of the magnetic recording medium of the present invention, in which (A) is an example of double layer structure and (B) is an example of triple layer structure.
Figure 1B:
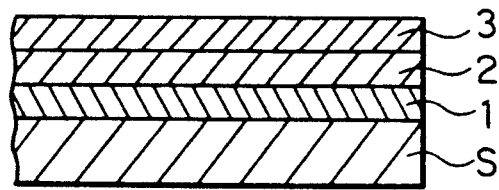

The magnetic recording medium of the present invention comprises a non-magnetic support and a plurality of magnetic layers formed thereon. The magnetic recording medium is exemplified by a combination of first magnetic layer 1 and second magnetic layer 2 formed on non-magnetic support S as shown in FIG. 1 (A), and a further combination of first magnetic layer 1, second magnetic layer 2 and third magnetic layer 3 formed on non-magnetic support S as shown in FIG. 1 (B).

In the present invention, an adhesive layer, including a cohesive layer, may be formed between the non-magnetic support and the magnetic layer, and a back-coating layer may be formed on the back face of the non-magnetic support.

Bending stiffness

It is an important feature 8 the present invention to provide a specific bending stiffness of the magnetic recording medium having the structure described above. Accordingly, it is important that the overall bending stiffness of the magnetic recording medium should be 150 to 450 mg, and the difference in the bending stiffness between the medium and the medium without its uppermost magnetic layer should be not more than 20 mg per μm thickness of the uppermost layer.

For efficiently preventing turbidity and noise while ensuring improved durability in the magnetic recording medium, the bending stiffness should meet the numerical requirements described above. Accordingly, too high or too low bending stiffness values are undesirable, since the durability can be poor, if the overall bending stiffness of the magnetic recording medium is below 150 mg, and head turbidity can worsen, if the overall bending stiffness exceeds 450 mg. Also, if the difference in the bending stiffness between the medium and the medium without its uppermost magnetic layer exceeds 20 mg per μm of thickness of the uppermost layer, it is undesirable for the present invention since it can cause severe head turbidity.

Figure 3:
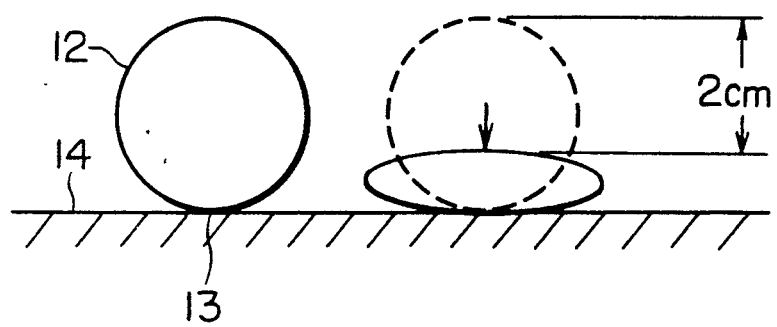
FIG. 3 is a schematic view of the magnetic recording medium in the process of mesurement of the bending stiffness.

The bending stiffness of the present invention is determined as illustrated in FIG. 3 and explained as follows:

A tape of the magnetic recording medium having a width of 0.5 inch and a length of 80 mm is prepared. Loop 12 is formed by bringing the ends of the tape together to form joint 13 with the magnetic layer facing outward. The loop is placed on planar base 14 with joint 13 at the bottom. A force sufficient to depress the top of the loop downward by 2 cm is applied and the amount thereof is measured. This amount, in mg, is defined as the bending stiffness of the medium. It varies significantly depending on the film thickness.

Magnetic layer

The magnetic layer described above basically contains ferromagnetic powder and a binder resin. Examples of ferromagnetic powder which is preferably used for the present invention include fine powders of ferromagnetic metals such as Co-containing $\gamma$-$Fe_2O_3$, Co-containing $Fe_3O_4$, Co-containing $FeO_x$ (X is 1⅓ to 1½), Fe-Al alloy, Fe-Ni alloy, Fe-Al-Ni alloy, Fe-Al-P alloy, Fe-Ni-Si-Al alloy, Fe-Ni-Si-Al-Mn alloy, Ni-Co alloy, Fe-Mn-Zn alloy, Fe-Ni-Zn alloy, Fe-Co-Ni-Cr alloy, Fe-Co-Ni-P alloy, Co-Ni alloy and Co-P alloy.

These ferromagnetic powders may be used singly or in combination of two or more kinds. Among these ferromagnetic powders is preferred fine Co-containing $\gamma$-$Fe_2O_3$ powder. These ferromagnetic powders serve well for high density recording because they are high in saturation magnetization force and coercive force (Hc).

Using a ferromagnetic powder having a great specific surface area such as with a BET value exceeding 40 $m^2/g$ makes it possible to obtain a recording medium which permits high density recording and which is excellent in S/N ratio and other parameters.

In the present invention, it is preferable to use a resin modified by introducing a functional group, particularly a modified polyurethane resin, modified vinyl chloride resin, or modified polyester resin, as the binder resin contained in each magnetic layer. Examples of the functional group described above include —SO$_3$M, —OSO$_2$M, —COOM, and

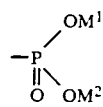

wherein M represents a hydrogen atom or an alkali metal such as lithium or sodium; M$^1$ and M$^2$, whether identical or not, independently represent a hydrogen atom, an alkali metal, or an alkyl group.

When the modified resin contains such a functional group, its compatibility with the ferromagnetic powder improves and the ferromagnetic powder becomes more dispersible. Also, the coating solution becomes more stable because ferromagnetic powder aggregation is prevented. This results in a well-balanced improvement in the frequency characteristics, ranging from the high frequency to low frequency bands, and improvements in the durability of the magnetic recording medium, as well as in the electromagnetic conversion. The modified resin described above may be used singly or in combination of two or more kinds.

The modified resin described above can be produced by dehydrochlorination condensation of vinyl chloride resin, polyurethane resin, or polyester resin with a compound having a negative functional group and chlorine in the molecular structure. Examples are Cl-CH$_2$CH$_2$SO$_3$M, Cl-CH$_2$CH$_2$OSO$_2$M, Cl-CH$_2$COOM, or

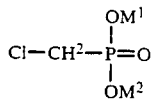

wherein M, M$^1$ and M$^2$ have the same definitions as above.

In the present invention, it is possible to use a thermoplastic resin, thermosetting resin, reactive resin, electron beam setting resin, which have traditionally been known in the field of magnetic recording media, or mixture thereof. These resins may be used in combination with the modified resins described above.

Examples of the thermoplastic resins include vinyl chloride-vinyl acetate copolymer, vinyl chloride-vinylidene chloride copolymer, vinyl chloride-acrylonitrile copolymer, acrylate-acrylonitrile copolymer, acrylate-vinylidene chloride copolymer, methacrylate-vinylidene chloride copolymer, methacrylate-ethylene copolymer, polyvinyl fluoride, vinylidene chloride-acrylonitrile copolymer, acrylonitrile-butadiene copolymer, polyamide, polyvinylbutyral, cellulose derivatives such as cellulose acetate butyrate, cellulose diacetate, cellulose triacetate, cellulose propionate, and nitrocellulose, styrene-butadiene copolymer, polyester resin, chlorovinyl ether-acrylate copolymer, amino resin, and synthetic rubber based thermoplastic resins. These thermoplastic resins may be used singly or in combination of two or more kinds.

Examples of the thermosetting resins or reactive resins described above include phenol resin, epoxy resin, polyurethane setting resin, urea resin, melamine resin, alkyd resin, silicone resin, acrylic reactive resin, high molecular polyester resin-isocyanate prepolymer mixture, methacrylate copolymer-diisocyanate prepolymer mixture, urea formaldehyde resin, and polyamine resin.

These thermosetting resins and reactive resins may be used singly or in combination of two or more kinds.

Examples of the electron beam setting resin described above include unsaturated prepolymers of the maleic anhydride type, urethane acrylic type, epoxy acrylic type, polyester acrylic type, polyether acrylic type, polyurethane acrylic type, and polyamide acrylic type. Also, useful are polyfunctional monomers of the ether acrylic type, urethane acrylic type, epoxy acrylic type, phosphate acrylic type, aryl type, and hydrocarbon type. These electron beam setting resins may be used singly or in combination of two or more kinds.

From the viewpoint of adjustability of bending stiffness, it is preferable to use the modified polyurethane described above and/or an unmodified polyurethane as the binder resin. This is because these resins permit easy adjustment of the bending stiffness of the magnetic layer in the desired range according to their content since the bending stiffness increases as the glass transition point rises. For this purpose, the glass transition point of the modified polyurethane or unmodified polyurethane described above is desirably −30° to 30° C.

The binder resin in the magnetic layer is normally 1 to 200 parts by weight, preferably 1 to 50 parts by weight, based on 100 parts by weight of the ferromagnetic powder.

Too high a content ratio of the binder resin results in a lower content of the ferromagnetic powder and can degrade the recording density of the magnetic recording medium; too low a content ratio of the binder resin results in a reduction in the mechanical strength of the magnetic layer and can degrade the running durability of the magnetic recording medium.

In the present invention, it is preferable to use a hardener in combination with the binder resin described above. Examples of preferred hardeners include aromatic polyisocyanates and/or aliphatic polyisocyanates. Examples of aromatic polyisocyanates include tolylene diisocyanate (TDI) and an active hydrogen compound adducts thereof, with preference given to those having an average molecular weight of 100 to 3000. Examples of aliphatic polyisocyanates include hexamethylene diisocyanate (HMDI) and active hydrogen compound adducts thereof, with preference given to those having an average molecular weight of 100 to 3000. Also preferred are non-aliphatic cyclic polyisocyanate and active hydrogen compound adducts thereof.

The reason it is preferable to use hardeners, particularly the aromatic polyisocyanates and/or aliphatic polyisocyanates described above, despite the fact that the present invention is operable in the absence of hardener, is that they permit easy adjustment of the bending stiffness in the desired range. The bending stiffness increases as the hardener content increases.

The ratio of the aromatic and/or aliphatic polyisocyanates to the binder resins is normally 1/20 to 7/10 by weight, preferably 1/10 to ½ by weight.

The magnetic recording medium of the present invention may contain various additives such as lubricants, non-magnetic abrasive grains, electro-conductive powders and surfactants in the magnetic layer.

Examples of the lubricants include silicone oil, graphite, molybdenum disulfide, and fatty acid esters which comprise a monobasic fatty acid having about 12 to 20 carbon atoms (such as stearic acid) and a monovalent alcohol having 3 to 26 carbon atoms.

Examples of the non-magnetic abrasive grains include alumina as α-Al$_2$O$_3$ (corundum), artificial corundum, fused alumina, silicon carbide, chromium oxide, diamond, artificial diamond, garnet, and emery, which consises mainly of corundum and magnetite. The weight ratio of the afrasive grains to the ferromagnetic powder is preferably not more than 20 to 100, and the average grain size is preferably not more than 0.5 μm, more preferably not more than 0.4 μm. It is also possible to improve the head contact properties such as sliding ability and wear resistance by adding the lubricant and non-magnetic abrasive grains described above to the outermost magnetic layer.

Examples of the electro-conductive powder described above include carbon black, graphite, silver powder and nickel powder. The average grain size of these electro-conductive powders is preferably between 5 and 100 mμ. Examples of the surfactant described above include natural, nonionic, anionic, cationic, and amphoteric surfactants. By adding these electro-conductive powders and surfactants to a magnetic layer, particularly the outermost magnetic layer, the surface electric resistance can be efficiently reduced and noise due to discharge of the electric charge and the drop-out phenomenon due to dust adhesion can be prevented.

As for the thickness of each magnetic layer, it can be set at any level, as long as the bending stiffness is kept in the range specified above, since the thickness correlates to the bending stiffness as described above.

Non-magnetic support

Examples of materials for the non-magnetic support include polyesters, such as polyethylene terephthalate and polyethylene 2,6-naphthalate; polyolefins, such as polypropylene; cellulose derivatives, such as cellulose triacetate and cellulose diacetate; plastics, such as polyamide and polycarbonate; metals, such as copper, aluminum and zinc; glass; boron nitride; silicon carbide; and ceramics.

The non-magnetic support is not subject to limitation as to shape; examples include tape, film, sheet, card, disc, and drum. The thickness of the non-magnetic support can be set at any level, as long as the bending stiffness is kept in the range specified above, since the thickness correlates to the bending stiffness as described above. The non-magnetic support may be of a single layer structure or multiple layer structure. The non-magnetic support may be subjected to a surface treatment such as corona discharge treatment.

Preparation of magnetic recording medium

The magnetic recording medium of the present invention is not subject to limitation with respect to its method of preparation; it can be produced in accordance with any known method which will provide a magnetic recording medium of the double or multiple layer structure. For example, magnetic layer forming components such as ferromagnetic powder and binder resin are kneaded and dispersed in a solvent to yield a magnetic coating solution, which is then sequentially or simultaneously coated on the surface of the non-magnetic support.

Examples of the solvent described above include ketones, such as acetone, methyl ethyl ketone (MEK), methyl isobutyl ketone (MIBK), and cyclohexanone; alcohols, such as methanol, ethanol, and propanol; esters, such as methyl acetate, ethyl acetate, butyl acetate, propyl acetate, ethyl lactate, and ethylene glycol monoacetate; ethers, such as diethylene glycol dimethyl ether, 2-ethoxyethanol, tetrahydrofuran, and dioxane; aromatic hydrocarbons, such as benzene, toluene and xylene; and halogenated hydrocarbons, such as methylene chloride, ethylene chloride, carbon tetrachloride, chloroform, ethylene chlorohydrin, and dichlorobenzene.

In the preparation of the magnetic coating solution, the ferromagnetic powder and other magnetic layer forming components described above are charged in a kneader simultaneously or separately. For example, the ferromagnetic powder is added to a solution containing a dispersant and, after kneading for a given time, the remaining components are added, followed by further kneading to yield a magnetic coating solution.

In the kneading and dispersion of the magnetic layer forming components, various kneaders can be used. Examples of the kneader include the double-roll mill, triple-roll mill, ball mill, pebble mill, side grinder, Sqegvari attriter, high speed impeller disperser, high speed stone mill, high speed impact mill, high speed mixer, homogenizer, and ultrasonic disperser.

Examples of coating methods include the wet-on-wet method, wet-on-dry method, dry-on-wet method, and dry-on-dry method, preferably the wet-on-wet method and wet-on-dry method, more preferably the wet-on-wet method. The wet-on-wet method is more advantageous than the other coating methods in that it offers stronger adhesion between the upper and lower layers and makes the surface of the magnetic layer smooth.

Examples of magnetic coating solution coating methods include gravure coating, knife coating, wire bar coating, doctor blade coating, reverse roll coating, dip coating, air knife coating, calender coating, squeeze coating, kiss coating, and fountain coating.

After coating the magnetic coating solution on the non-magnetic support, the coat while remaining undried is subjected to a magnetic field orientation treatment followed by a surface smoothing treatment using a super-calender roll or another means to yield a bulk strip.

Figure 2:
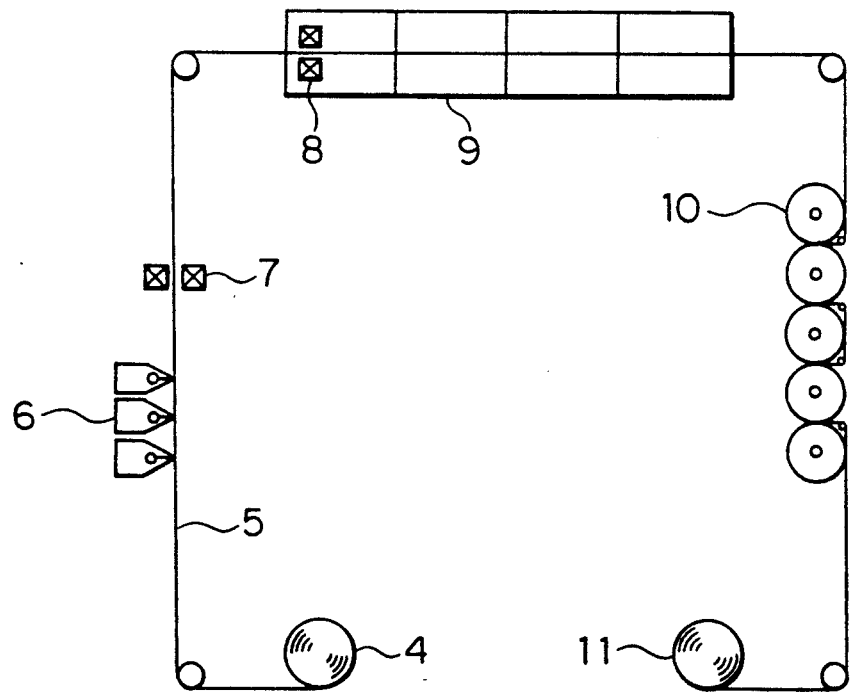
FIG. 2 is a schematic flow chart of one method for the production of the magnetic recording medium of the present invention.

FIG. 2 illustrates the process described above, in which non-magnetic support 5, wound back from roll 4, is coated with the magnetic coating solution in coater 6, after which it is treated (e.g., 2000 G) in first magnetic field orientation apparatus 7 and second magnetic field orientation apparatus 8, and passed through drier 9 and then subjected to a surface smoothing treatment in super-calender 10 and wound up on roll 11. The bulk strip thus obtained is cut into pieces with the desired shape and size to yield a magnetic recording medium.

EXAMPLES

The present invention is hereinafter described in more detail by means of the following working examples and comparative examples. In the examples below, "part(s)" means "part(s) by weight".

Examples 1 through 6 and Comparative Examples 1 through 9

| Composition for the uppermost layer | |
|---|---|
| Ferromagnetic powder (Co-containing γ-Fe$_2$O$_3$ having a BET value of 55 m$^2$/g) | 100 parts |
| Vinyl chloride copolymer containing an epoxy group and a metal sulfonate group (MR110, produced by Nippon Zeon) | 13 parts |
| Polyurethane resin (UR 8300, produced by Toyobo Co., which is an aromatic pdyester type polyurethane resin containing metal sulfonate groups) | 8 parts |
| Stearic acid | 2 parts |

| Composition for the uppermost layer | |
|---|---|
| Butyl stearate | 2 parts |
| Carbon black having an average grain size of 40 mμ | 3 parts |
| Alumina dispersion: | |
| Spherical alumina having a grain size of 0.2 μm | 6 parts |
| Polyurethane resin (UR 8300, produced by Toyobo Co.) | 1 part |
| 1:1:1 mixture of methyl ethyl ketone, toluene and cyclohexanone | 7 parts |

After all the components of the composition for the uppermost layer except for the alumina dispersion are premixed with 14 parts of methyl ethyl ketone and 14 parts of toluene. The alumina dispersion was added, along with 40 parts of methyl ethyl ketone, 40 parts of toluene, and 60 parts of cyclohexanone, and the mixture was dispersed using a sand mill.

To the resulting dispersion, trifunctional isocyanate was added in an amount shown in Table 1, and this mixture was thoroughly kneaded with 45 parts of methyl ethyl ketone and 45 parts of toluene and passed through a filter to yield a magnetic coating solution A.

| Composition for the lower layer | |
|---|---|
| Ferromagnetic powder (Co-containing γ-Fe$_2$O$_3$ having a BET value of 40 m$^2$/g) | 100 parts |
| Spherical alumina having a grain size of 0.1 μm | 5 parts |
| Vinyl chloride copolymer (MR110, produced by Nippon Zeon) | 17 parts |
| Polyurethane resin (containing a metal sulfonate group) | 13 parts |
| Stearic acid | 1 part |
| Butyl stearate | 1 part |
| Carbon black having an average grain size of 20 mμ | 3 parts |

After all the components of the composition for the lower layer were kneaded with 12 parts of methyl ethyl ketone and 12 parts of toluene, 88 parts of methyl ethyl ketone, 88 parts of toluene and 100 parts of cyclohexanone were added, and the mixture was thoroughly dispersed. To the resulting dispersion, trifunctional isocyanate was added in an amount shown in Table 1 and passed through a filter to yield a magnetic coating solution B.

Then, a fine extrusion coater (FEC) was used to simultaneously coat the magnetic coating solutions A and B on a polyester base film of 13 μm in thickness so that the uppermost layer became 0.6 μm ahd the lower layer was thicker.

Subsequently, while the coat remained undried, magnetic field orientation was carried out at 2000 G in a solenoid, followed by calendering. Then, coating solution C comprising the following back-coating composition was coated on the back face of the polyester base film to a final coat thickness of 0.6 μm to yield a bulk strip. This bulk strip was slit to a 0.5 inch width to yield a tap sample.

| Back-coating composition | |
|---|---|
| Carbon black having a grain size of 22 mμ | 100 parts |
| Carbon black having a grain size of 75 mμ | 10 parts |
| Calcium carbonate powder having a grain size of 130 mμ | 10 parts |
| Nitrocellulose (Celnova, produced by Asahi Chemical Industry, BTH ½) | 40 parts |
| Polyurethane resin (N3141, produced by Nippon Polyurethane Industry, low molecular type, MW 50000, containing a hydroxyl group, and secondary amine and tertiary amine in the main chain of urethan) | 50 parts |
| Polyisocyanate (Coronate 3041) | 15 parts |
| Cyclohexanone | 275 parts |
| Methyl ethyl ketone | 500 parts |
| Toluene | 500 parts |

The performance of the tape sample thus obtained was determined as follows:

(a) Overall bending stiffness of the magnetic recording medium

The tape sample of 0.5 inch in width and 80 mm in length was prepared. A loop was formed by bringing the ends of the tape together with the magnetic layer facing outward. The loop was placed on a planer with the joint at the bottom. A force sufficient to depress the top of the loop downward by 2 cm was applied and weight amount thereof was measured.

(b) Difference in the bending stiffness between the medium and the medium without its uppermost layer per μm thickness of the uppermost layer.

It is expressed as the difference between the bending stiffness obtained in (a) and the bending stiffness obtained after removing the uppermost layer.

(c) Head turbidity

After the tape sample was run at a temperature of 20° C. and a humidity of 20% for 1 hour, the head is detached and observed microscopically. Evaluation criteria are: no turbidity (E), slight turbidity (G), distinct turbidity (P).

(d) Rubbing noise

After the tape sample is subjected to 10 passes, the determination is made at 8 MHz, and the value obtained is expressed relative to the value obtained with the reference tape.

(e) Durability

Evaluated after the tape sample is subjected to 50 full length passes at a temperature of 40° C. and a humidity of 80%.

Evaluation criteria are: acceptable (G), unacceptable (P).

TABLE 1

| | Addition amount (parts) of trifunctional isocyanate | |
|---|---|---|
| | Lower layer | Uppermost layer |
| Comparative Example 1 | 5 | 3 |
| Comparative Example 2 | 5 | 10 |
| Comparative Example 3 | 5 | 15 |
| Example 1 | 8 | 3 |
| Example 2 | 8 | 10 |
| Comparative Example 4 | 8 | 15 |
| Example 3 | 15 | 3 |
| Example 4 | 15 | 10 |
| Comparative Example 5 | 15 | 15 |
| Example 5 | 20 | 3 |
| Example 6 | 20 | 10 |
| Comparative Example 6 | 20 | 15 |
| Comparative Example 7 | 23 | 3 |
| Comparative Example 8 | 23 | 10 |
| Comparative | 23 | 15 |

TABLE 1-continued

| | Addition amount (parts) of trifunctional isocyanate | |
|---|---|---|
| | Lower layer | Uppermost layer |
| Example 9 | | |

TABLE 2

| | BS1 (mg) | BS2 (mg/μm) | Turbidity | rubbing noise (dB) | Durability |
|---|---|---|---|---|---|
| Comparative Example 1 | 100 | 8 | P | 2.3 | P |
| Comparative Example 2 | 100 | 20 | P | 3.3 | P |
| Comparative Example 3 | 100 | 25 | P | 6.2 | P |
| Example 1 | 150 | 8 | E | 2.5 | G |
| Example 2 | 150 | 20 | E | 3.4 | G |
| Comparative Example 4 | 150 | 25 | P | 6.4 | G |
| Example 3 | 320 | 8 | E | 2.6 | G |
| Example 4 | 320 | 20 | G | 3.6 | G |
| Comparative Example 5 | 320 | 25 | P | 7.1 | G |
| Example 5 | 450 | 8 | E | 2.9 | G |
| Example 6 | 450 | 20 | G | 3.8 | G |
| Comparative Example 6 | 450 | 25 | P | 7.5 | P |
| Comparative Example 7 | 500 | 8 | P | 4.8 | P |
| Comparative Example 8 | 500 | 20 | P | 6.2 | P |
| Comparative Example 9 | 500 | 25 | P | 8.3 | P |

Note:
BS1 = overall bending stiffness of the magnetic recording medium
BS2 = reduction in the bending stiffness per μm of the uppermost layer in the portion remaining after removing the uppermost

What we claim is:

1. A magnetic recording medium having a non-magnetic support and plurality of magnetic layers formed thereon, which layers contain a ferromagnetic powder and a binder, wherein a bending stiffness of said medium is 150 to 450 mg and a difference in the bending stiffness between said medium and said medium without its uppermost magnetic layer is not more than 20 mg per 1 μm of thickness of the uppermost magnetic layer.

2. The magnetic recording medium of claim 1 wherein the ferromagnetic powder in at least one of the magnetic layers comprises Co-containing $\gamma\text{-Fe}_2\text{O}_3$ powder.

3. The magnetic recording medium of claim 2 wherein each of said magnetic layers comprises Co-containing $\gamma\text{-Fe}_2\text{O}_3$ powder.

4. The magnetic recording medium of claim 1 wherein the ferromagnetic powder in at least one of said magnetic layers has a BET specific surface area of at least 40 m²/g.

5. The magnetic recording medium of claim 1 wherein the binder in at least one of the magnetic layers comprises a resin having a functional group selected from the group consisting of $-SO_3M$, $-OSO_2M$, $-COOM$, and

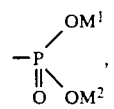

wherein M represents hydrogen or alkali metal, and $M^1$ and $M^2$ independently represent hydrogen, lithium, potassium, sodium, or an alkyl group.

6. The magnetic recording medium of claim 5 wherein said resin is a polyurethane resin.

7. The magnetic recording medium of claim 1 wherein said binder comprises a resin, the resin in at least one of the magnetic layers comprising polyurethane resin.

8. The magnetic recording medium of claim 1 wherein the binder in at least one of the magnetic layers comprises a resin having a glass transition point of $-30°$ to $30°$ C.

9. The magnetic recording medium of claim 7 wherein said polyurethane resin has a glass transition point of $-30°$ to $30°$ C.

10. The magnetic recording medium of claim 5 wherein there is an amount of 1 to 200 parts of said resin per 100 parts by weight of said ferromagnetic powder is present in at least one of said layers.

11. The magnetic recording medium of claim 10 wherein said amount is 1 to 50 parts.

12. The magnetic recording medium of claim 1 wherein at least one of the magnetic layers comprises a hardener.

13. The magnetic medium of claim 12 wherein said hardener is an aliphatic polyisocyanate or an aromatic polyisocyanate.

14. The magnetic medium of claim 13 wherein a ratio of total of said aliphatic polyisocyanate and said aromatic polyisocyanate to said binder is 1:20 to 7:10 by weight.

15. The magnetic medium of claim 14 wherein said ratio is 10 to 1:2.

16. The magnetic recording medium of claim 5 wherein said functional group is $-SO_3M$.

17. The magnetic recording medium of claim 4 wherein the ferromagnetic powder in each of said magnetic layers has a BET specific surface area of at least 40 m²/g.

18. A method of producing a magnetic recording medium which comprises;
    forming a plurality of magnetic layers on a non-magnetic support, which layers contain a ferromagnetic powder and a binder, so that a bending stiffness of the medium is 150 to 450 mg and that a difference in the bending stiffness between said medium and said medium without its uppermost magnetic layer is not more than 20 mg per 1 μm of thickness of said uppermost magnetic layer.

19. The method of claim 18 wherein said forming comprises wet-on-wet coating.

* * * * *